United States Patent
Kezuka et al.

(10) Patent No.: US 12,197,101 B2
(45) Date of Patent: Jan. 14, 2025

(54) OPTICAL WAVEGUIDE DEVICE AND OPTICAL MODULATOR

(71) Applicant: Fujitsu Optical Components Limited, Kawasaki (JP)

(72) Inventors: Akihito Kezuka, Kawasaki (JP); Tamotsu Akashi, Atsugi (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 349 days.

(21) Appl. No.: 17/865,766

(22) Filed: Jul. 15, 2022

(65) Prior Publication Data
US 2023/0132105 A1     Apr. 27, 2023

(30) Foreign Application Priority Data
Oct. 21, 2021    (JP) ................................ 2021-172686

(51) Int. Cl.
*G02F 1/225*     (2006.01)
*G02F 1/065*     (2006.01)
*G02F 1/21*     (2006.01)

(52) U.S. Cl.
CPC ............ *G02F 1/225* (2013.01); *G02F 1/065* (2013.01); *G02F 1/212* (2021.01)

(58) Field of Classification Search
None
See application file for complete search history.

(56) References Cited

U.S. PATENT DOCUMENTS

| | | | |
|---|---|---|---|
| 11,442,298 B2* | 9/2022 | Mitamura | G02F 1/065 |
| 2003/0033975 A1* | 2/2003 | Bazylenko | G02B 6/122 |
| | | | 117/84 |
| 2003/0061836 A1* | 4/2003 | Higuchi | G02B 6/1221 |
| | | | 385/129 |
| 2009/0022445 A1* | 1/2009 | Hochberg | G02F 1/065 |
| | | | 359/278 |
| 2019/0067830 A1 | 2/2019 | Xu et al. | |
| 2021/0072569 A1 | 3/2021 | Mitamura | |
| 2021/0318588 A1* | 10/2021 | Wakabayashi | G02F 1/225 |

FOREIGN PATENT DOCUMENTS

| | | |
|---|---|---|
| JP | 2013-054239 | 3/2013 |
| JP | 2021-033141 | 3/2021 |
| JP | 2021-43263 A | 3/2021 |

OTHER PUBLICATIONS

Japanese Office Action issued in corresponding Japanese Application No. 2021-172686 dated Nov. 26, 2024.

* cited by examiner

*Primary Examiner* — Jerry Rahll
(74) *Attorney, Agent, or Firm* — STAAS & HALSEY LLP

(57) ABSTRACT

An optical waveguide device includes a slot groove formed in a substrate; a pair of electrodes disposed in the slot groove; an electro-optic polymer material in the slot groove; and a step portion formed at an outer side of the slot groove, in a length direction of the slot groove.

9 Claims, 9 Drawing Sheets

OPTICAL WAVEGUIDE DEVICE AND OPTICAL MODULATOR

CROSS REFERENCE TO RELATED APPLICATIONS

This application is based upon and claims the benefit of priority of the prior Japanese Patent Application No. 2021-172686, filed on Oct. 21, 2021, the entire contents of which are incorporated herein by reference.

FIELD

The embodiments discussed herein relate to an optical waveguide device and an optical modulator.

BACKGROUND

Optical modulators have increased in speed to cope with increases in the transmission capacity of optical communications networks. As for an optical modulator capable of implementing ultrafast optical communication, an optical modulator has been proposed that uses an electro-optic (EO) polymer material that has a broadband and a higher electro-optical effect than conventional lithium niobate ($LiNbO_3$). The optical modulator in which the EO polymer material is between two adjacent conductive electrodes has a low driving voltage and is heat resistant.

In one optical modulator that uses an EO polymer material, for example, a slot groove is formed in a $SiO_2$ (silica) layer of a silicon (Si) substrate, a pair of electrodes that face each other are provided a bottom of the slot groove, and the slot groove is filled with an EO polymer material. For an example, refer to Japanese Laid-Open Patent Publication No. 2021-43263).

SUMMARY

According to an aspect of an embodiment, an optical waveguide device includes a slot groove formed in a substrate; a pair of electrodes disposed in the slot groove; an electro-optic polymer material in the slot groove; and a step portion formed at an outer side of the slot groove, in a length direction of the slot groove.

An object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4BB is a diagram depicting a state in which the optical waveguide device is filled with the EO polymer material.

DESCRIPTION OF THE INVENTION

First, problems associated with the conventional techniques are discussed. In the optical modulator, it is difficult to keep the EO polymer material within the slot groove and the EO polymer material spreads outside the slot groove. For example, while a width of the slot groove is preferably about a several tens of microns to ensure optical modulation characteristics, in instances in which the width of the slot groove is narrower than an inner diameter of a dispenser nozzle of the EO polymer or an instance in which a solution of the EO polymer material has a low concentration, the EO polymer material discharged from the dispenser nozzle flows outside of the slot groove and spreads on the $SiO_2$ layer. When the EO polymer material adheres to other device elements, electrodes, etc. mounted on a surface of the Si substrate, assembly at a subsequent process, reliability, and the like are affected.

Embodiments of an optical waveguide device and an optical modulator are described in detail with reference to the accompanying drawings. In the embodiments, as the optical waveguide device, an optical modulator that uses an EO polymer material is described as an example. The optical modulator has an optical transmitting unit for optical transmission and is configured to convert an input electrical signal into an optical signal and optically transmit the optical signal.

Figure 1:
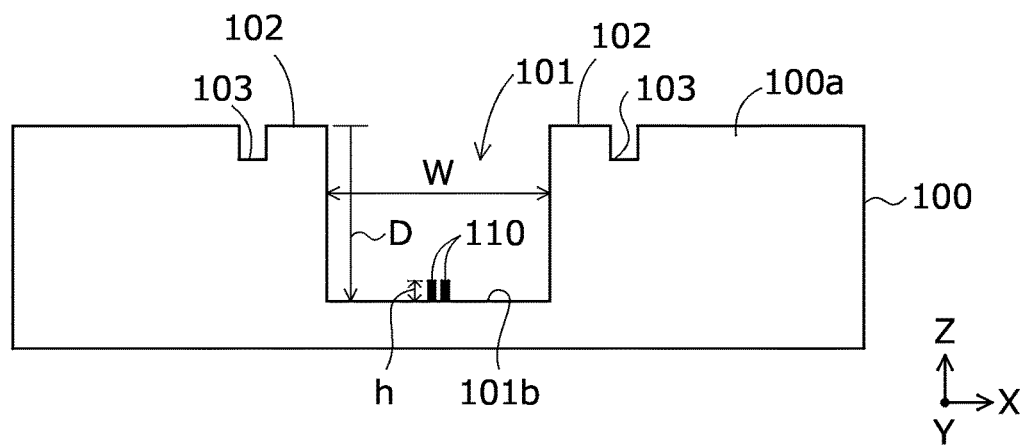
FIG. 1 is a cross-sectional view of a portion of an optical waveguide device according to an embodiment.
Figure 2:
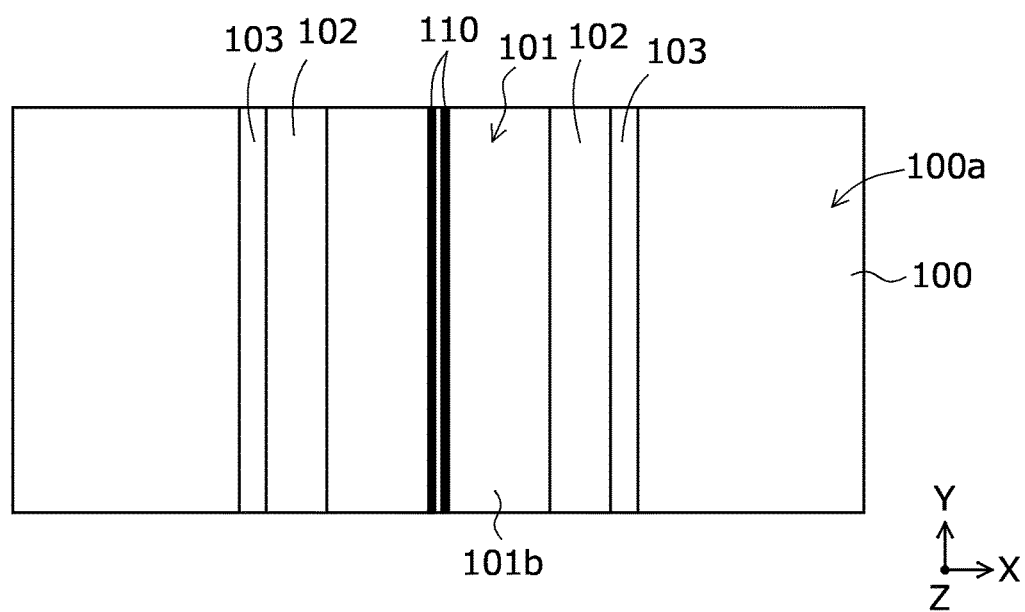
FIG. 2 is a plan view of the portion of the optical waveguide device according to the embodiment.

A configuration example of the optical waveguide device is described. FIG. 1 is a cross-sectional view of a portion of the optical waveguide device according to an embodiment; FIG. 2 is a plan view of the portion of the optical waveguide device according to the embodiment. In a $SiO_2$ layer 100 on a surface of a substrate, a slot groove 101 having a predetermined width in a width direction X and a predetermined length in a length direction Y is formed.

The substrate includes, for example, an Si substrate and the $SiO_2$ layer 100 formed on the surface of the Si substrate. In FIG. 1, the $SiO_2$ layer 100 positioned most superficially on the surface of the substrate is depicted. The slot groove 101, for example, is a part of a configuration of a Mach-Zehnder interferometer of the optical modulator. Herein, firstly, a structure of a periphery of the slot groove 101 is described and configuration of parts of the optical modulator is described later.

In a center portion of a bottom 101b of the slot groove 101, a pair of electrodes 110 having a predetermined interval therebetween in an X-direction and continuous in a Y-direction is provided. Further, at a surface 100a of the $SiO_2$ layer 100, a step portion 102 continuous in the length direction (the Y-direction) of the slot groove 101 is provided on both sides of the slot groove 101.

In the example depicted in FIG. 1, at the surface of the substrate, on both sides of the slot groove 101 in the width direction thereof (the X-direction), a recess 103 continuous in the length direction (the Y-direction) of the slot groove 101 is provided a predetermined distance from the slot groove 101. The recesses 103 are provided on the sides of the slot groove 101, respectively, whereby between the slot groove 101 and each of the recesses 103, the step portions 102 that are continuous in the length direction (the Y-direction) of the slot groove 101 are formed.

Figure 3:
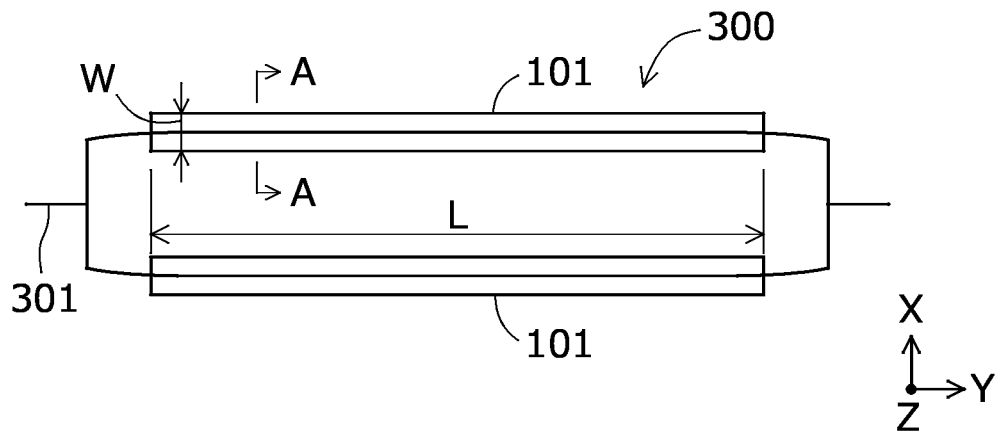
FIG. 3 is a plan view of a Mach-Zehnder interferometer portion.

FIG. 3 is a plan view of a Mach-Zehnder interferometer portion. FIG. 3 depicts a Mach-Zehnder interferometer 300 that is a portion of the optical modulator and that uses the optical waveguide device whose structure is partially depicted in FIGS. 1 and 2. Light propagated in an optical waveguide 301 is modulated by applying voltage to the electrodes 110 (refer to FIG. 1) in the slot groove 101 of the Mach-Zehnder interferometer 300.

The optical waveguide 301 splits light by optical waveguides of two arms and thereafter again couples the light by optical waveguides and outputs the light. The partial cross-section depicted in FIG. 1 corresponds to a cross-section of one of the optical waveguide branches, along cutting line A-A in FIG. 3.

In FIGS. 1 to 3, for example, a width W of the slot groove 101 is about 30 µm, a depth D thereof is at least about 10 µm, and a length L thereof is about several mm. Further, for example, a height h of each of the electrodes 110 is about 0.3 µm. Further, for example, a depth of each of the recesses 103 is about several nm to several µm.

Figure 4A:
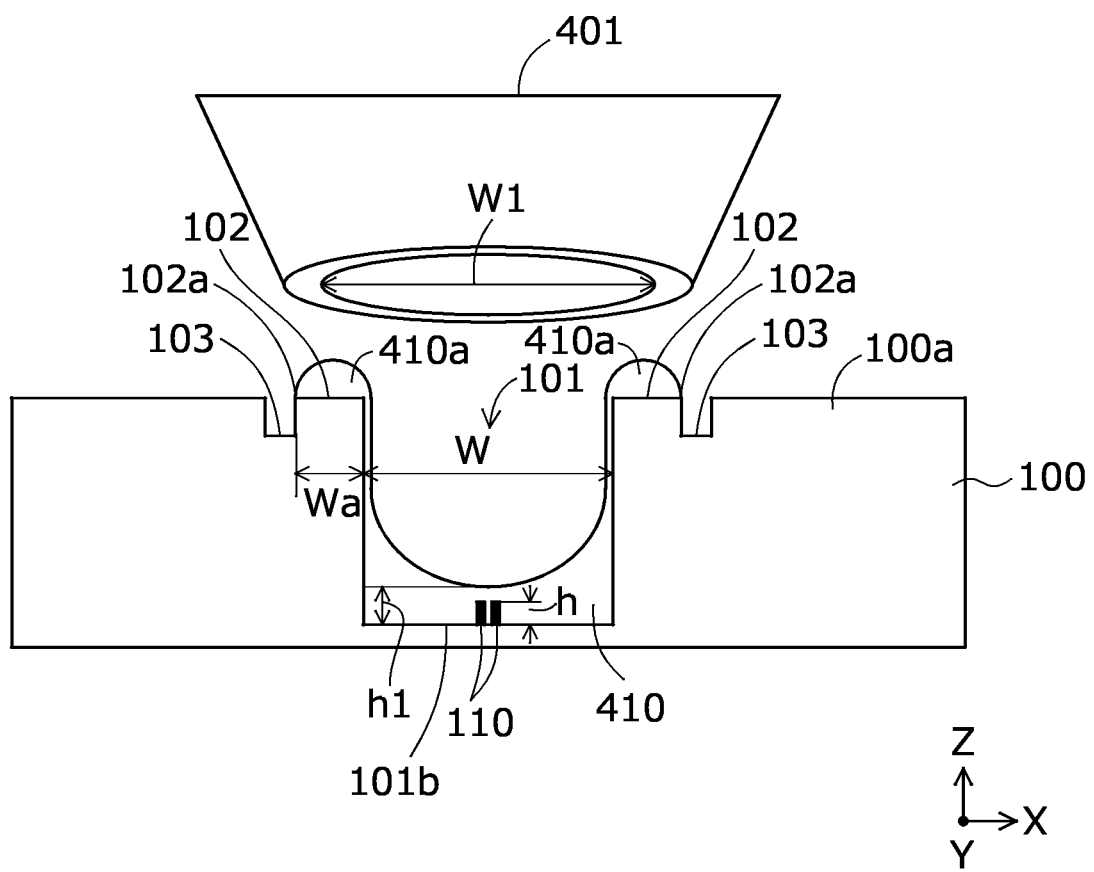
FIG. 4A is a diagram depicting a state in which the optical waveguide device is filled with an EO polymer material.
Figure 4B:
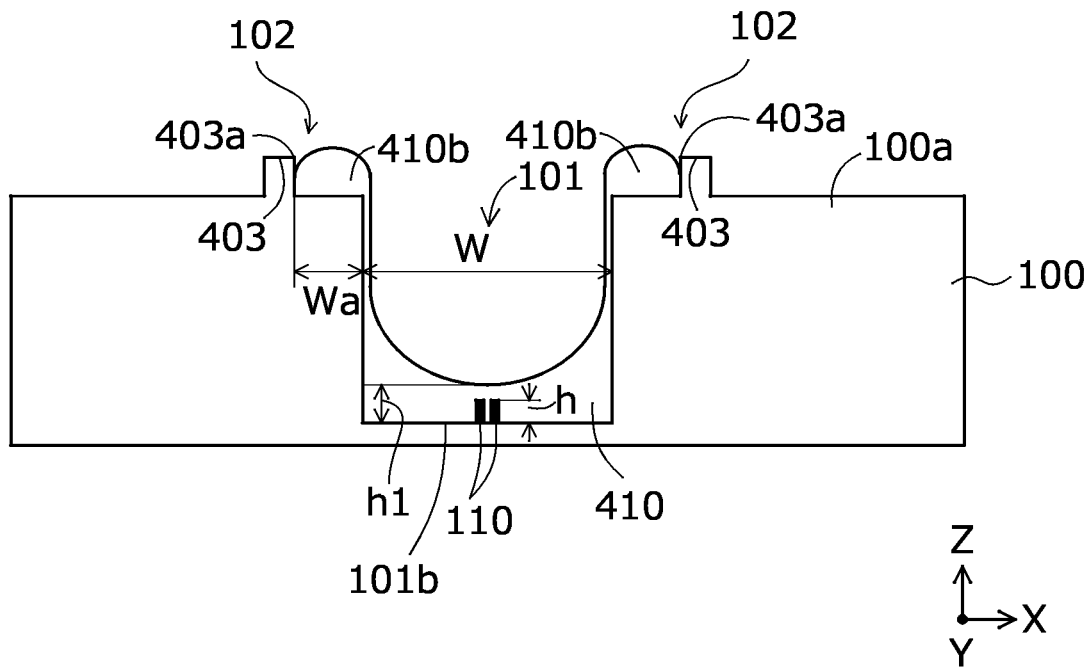
FIG. 4BA is a diagram depicting a state in which the optical waveguide device is filled with the EO polymer material.
Figure 4B:
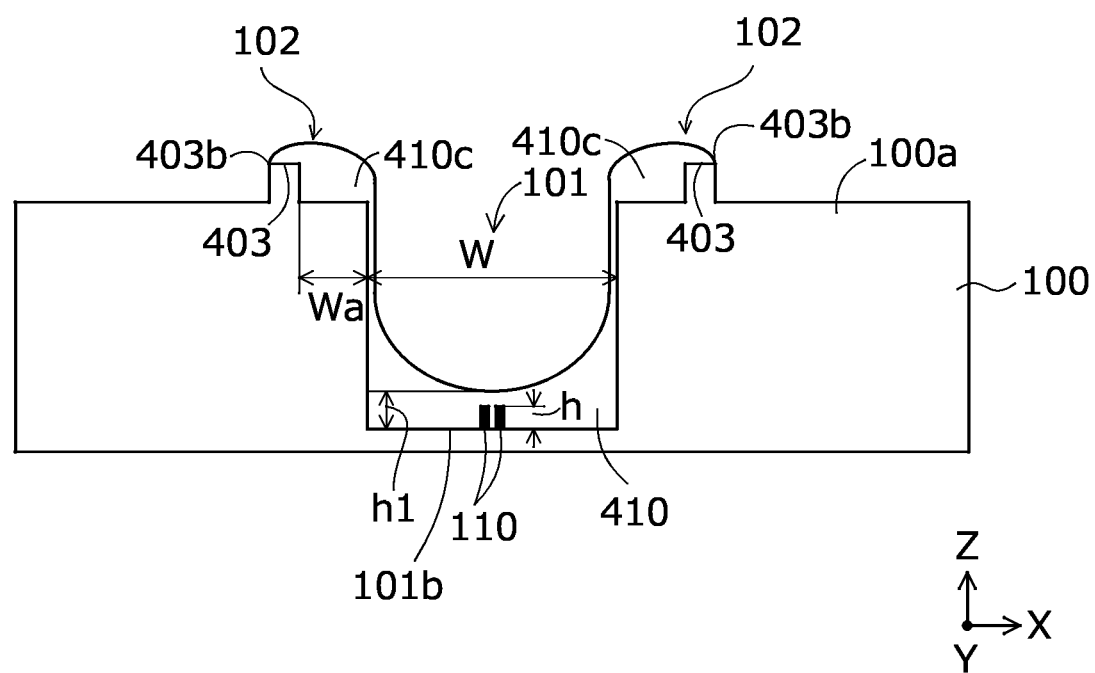

FIGS. 4A, 4BA, and 4BB are diagrams depicting states in which the optical waveguide device is filled with the EO polymer material. FIGS. 4A, 4BA, and 4BB depict different configuration examples of the step portions 102. In FIG. 4A, a dispenser is positioned at an upper portion of the slot groove 101 depicted in FIG. 1, the dispenser is moved along a length (the Y-direction) of the slot groove 101 while the slot groove 101 is filled with an EO polymer material 410 from a dispenser nozzle 401.

As depicted in FIG. 4A, an inner diameter W1 of the dispenser nozzle 401 is about 40 µm and at present, is wider than the width W of the slot groove 101. From the dispenser nozzle 401, the EO polymer material 410 is discharged in a liquid state, between the electrodes 110 in the slot groove 101 and on the electrodes 110. In the slot groove 101, the EO polymer material 410 has a meniscal shape in a cross-sectional view thereof; thereafter, the liquid volatizes and is cured. Here, the EO polymer material 410 has to be formed to have a predetermined height (thickness) h1 from the bottom 101b of the slot groove 101.

Figure 5:
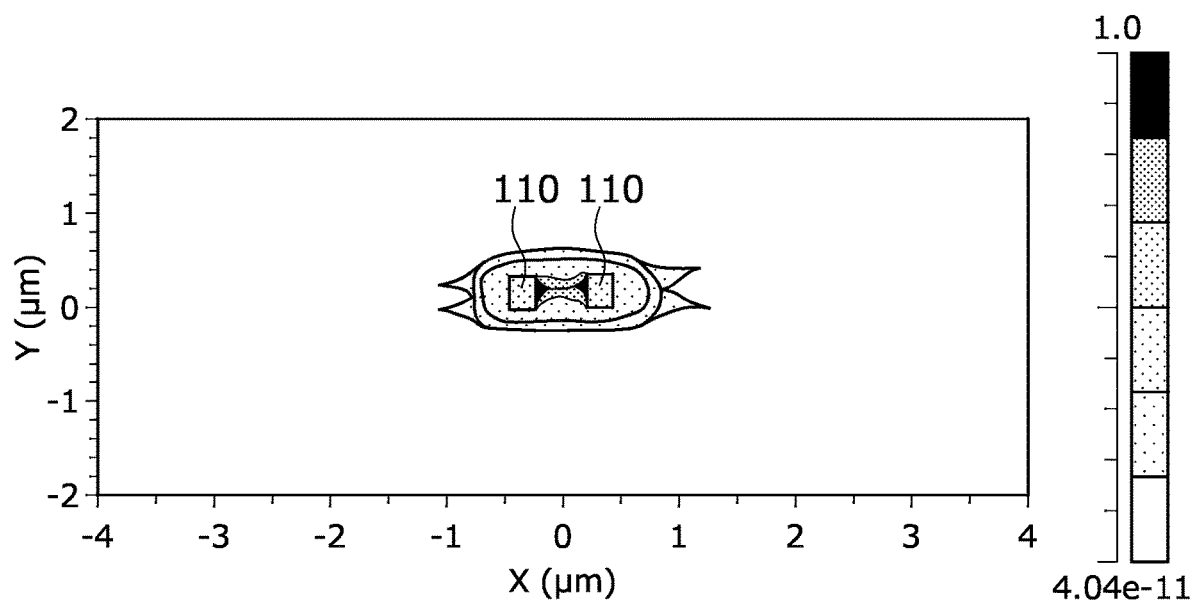
FIG. 5 is a diagram depicting light intensity distribution of a Mach-Zehnder interferometer portion.

FIG. 5 is a diagram depicting light intensity distribution of the Mach-Zehnder interferometer portion. The optical waveguide 301 that uses the EO polymer material 410 has an oval-shaped light intensity distribution that is centered about the pair of electrodes 110 and about 2 times the height h of the electrodes 110.

Therefore, from the bottom 101b, the necessary thickness h1 of the EO polymer material 410 depicted in FIG. 4A preferably may be about 2 times the height h of the electrodes 110. For example, in an instance in which the height h of the electrodes 110 is 0.3 µm, the necessary thickness h1 of the EO polymer material 410 from the bottom 101b is about 0.6 µm.

When the thickness h1 of the EO polymer material 410 in the slot groove 101 is thin, propagated light is scattered, resulting in propagation loss. To reduce propagation loss, the thickness h1 of the EO polymer material has to be about 0.6 µm. Here, when the thickness h1 of the EO polymer material 410 is thick, peeling and cracking from the interface occur due to stress during drying and shrinkage. When peeling and cracking occur in the optical waveguide 301, propagation loss occurs. For example, to suppress peeling from the interface of the EO polymer material 410, it is conceivable to make the EO polymer material 410 as a low-concentration solution so that the film thickness of a single application is thin.

Here, in an instance in which the EO polymer material 410 of a low concentration is simply applied in the slot groove 101, the EO polymer material 410 creeps up side-walls of the slot groove 101 due to surface tension. For the EO polymer material 410, the lower is the concentration (viscosity), the greater is the creep along the sidewalls of the slot groove 101. Here, when the number of applications is increased to ensure the thickness h1 of the EO polymer material 410 in the slot groove 101, cracks in the EO polymer material 410 easily occur from the portion by which the thickness of the EO polymer material 410 is increased at the sidewalls of the slot groove 101.

Further, due to spreading of the EO polymer material 410, the amount of the (liquid) EO polymer material 410 in the slot groove 101 decreases. In this instance, ensuring the thickness h1 of the EO polymer material 410 in the optical waveguide 301 (the slot groove 101) is difficult, whereby optical characteristics degrade.

To address these problems, in the embodiment, the necessary amount of the thickness h1 of the EO polymer material 410 is ensured and uniform, and a structure that prevents spreading at the surface 100a of the $SiO_2$ layer 100 is provided. For example, even in an instance in which the EO polymer material 410 is a low-concentration solution and the film thickness of a single application is thin, spreading at the surface 100a of the $SiO_2$ layer 100 after creep along the sidewalls of the slot groove 101 is prevented.

As depicted in FIG. 4A, when the slot groove 101 portion is filled with the EO polymer material 410, the EO polymer material 410 in the slot groove 101 moves up both sidewalls of the slot groove 101 due to surface tension and thus, has a meniscal shape in a cross-sectional view thereof. As a result, creep of the EO polymer material 410 in the slot groove 101 occurs along the sidewalls of the slot groove 101 due to surface tension.

Here, in the embodiment, at the surface of the substrate, the step portions 102 are provided at both sides of the slot groove 101 in the length direction (the Y-direction) of the slot groove 101. The step portions 102 depicted in FIG. 4A are formed between the slot groove 101 and the recesses 103 by the recesses 103 formed at the surface of the substrate, for example, the surface 100a of the $SiO_2$ layer 100.

For example, the recesses 103 may be formed by disposing a mask at locations on the $SiO_2$ layer 100 other than those for the recesses 103 and performing etching. Further, by forming the recesses 103, the step portions 102 having a predetermined width Wa are formed between the slot groove 101 and the recesses 103. A height position of the surface of each of the step portions 102 is the same as a height position of the surface 100a of the $SiO_2$ layer 100.

By providing the step portions 102, the EO polymer material 410 that creeps up both sidewalls of the slot groove 101 stays at the step portions 102 as viewed from the width direction (the X-direction). Wettability degrades at outer ends 102a (inner ends of the recesses 103) of the step portions 102 due to so-called flux pinning and the EO polymer material 410 remains (reference character 410a) in a raised shape at the step portions 102 due to surface tension.

The step portions 102 (the recesses 103) are provided, whereby spreading of the EO polymer material 410 to the surface 100a of the $SiO_2$ layer 100 is prevented. The step portions 102 prevent spreading of the EO polymer material 410 outside (to the surface 100a of the $SiO_2$ layer 100), on both sides of the slot groove 101 in the width direction (the X-direction), along an entire area in the length direction (the Y-direction) of the slot groove 101.

FIGS. 4BA and 4BB depict another configuration example of the step portions 102. The step portions 102 depicted in FIGS. 4BA and 4BB include wall portions 403 formed on the surface of the substrate, for example, the surface 100a of the $SiO_2$ layer 100. In FIGS. 4BA and 4BB, the dispenser nozzle 401 is not depicted.

The wall portions 403 are formed on the surface 100a of the $SiO_2$ layer 100, at positions apart from the slot groove 101 by a distance equivalent to the predetermined width Wa in the width direction of the slot groove 101. For example, the wall portions 403 may be formed by disposing a mask at formation regions of the wall portions 403 on the $SiO_2$ layer 100 and performing etching. Further, a height position of the surface of each of the wall portions 403 is the same as the height position of the surface 100a of the $SiO_2$ layer 100.

The step portions 102 (the wall portions 403) are provided, whereby the EO polymer material 410 that moves up both sidewalls of the slot groove 101 remains at the step portions 102 (the wall portions 403) as viewed from the width direction (the X-direction).

As depicted in FIG. 4BA, in an instance in which the amount of EO polymer material that moves up is small, the EO polymer material 410 remains (reference character 410b) at slot-groove-facing walls 403a of the wall portions 403. On the other hand, as depicted in FIG. 4BB, in an instance in which the amount of EO polymer material that moves up is large, wettability degrades at outward-facing walls 403b of the wall portions 403 due to so-called flux pinning and the EO polymer material 410 remains (reference character 410c) in a raised shape at the wall portions 403 due to surface tension.

The step portions 102 (the wall portions 403) are provided, whereby spreading of the EO polymer material 410 to the surface 100a of the $SiO_2$ layer 100 is prevented. The step portions 102 prevent spreading of the EO polymer material 410 outside (to the surface 100a of the $SiO_2$ layer 100), on both sides of the slot groove 101 in the width direction (the X-direction), along an entire area in the length direction (the Y-direction) of the slot groove 101.

In the examples depicted in FIGS. 4A, 4BA, and 4BB, the surface of each of the step portions 102 is assumed to be flat. For the step portions 102 in the example depicted in FIG. 4A, bottoms of the recesses 103 are assumed to be flat, and for the step portions 102 in the examples depicted in FIGS. 4BA and 4BB, an upper surface of each of the wall portions 403 is assumed to be flat. Without limitation hereto, the step portions 102 may assume various of shapes obtained by flux pinning and, for example, each of the step portions 102 may be formed in a shape that has a vertex in which the sidewalls are sloped such as a triangular (Δ) or the sidewalls may be formed in an arc shape or in a shape of multiple steps. For example, each of the step portions 102 in the example depicted in FIG. 4A may be shaped so that the recesses 103 have an inverted triangular shape (∇). Further, each of the step portions 102 in the examples depicted in FIGS. 4BA and 4BB may be shaped so that the wall portions 403 have a triangular shape (Δ).

The step portions 102 depicted in FIGS. 4A, 4BA, and 4BB are provided, whereby spreading of the EO polymer material 410 on the surface 100a of the $SiO_2$ layer 100, beyond the step portions 102 in the width direction (the X-direction) is prevented. As a result, contamination of other device elements mounted on the surface 100a of the $SiO_2$ layer 100 may be prevented.

At the same time, of the EO polymer material 410 in the slot groove 101, the amount suppressed from flowing outside the slot groove 101 can be retained in the slot groove 101. Further, the EO polymer material 410 in the slot groove 101 may be ensured to have the necessary thickness h1. Further, the number of applications of the EO polymer material 410 may be reduced, whereby the amount of the EO polymer material 410 used may be reduced correspondingly, and the number of manufacturing processes may be reduced.

Figure 6:
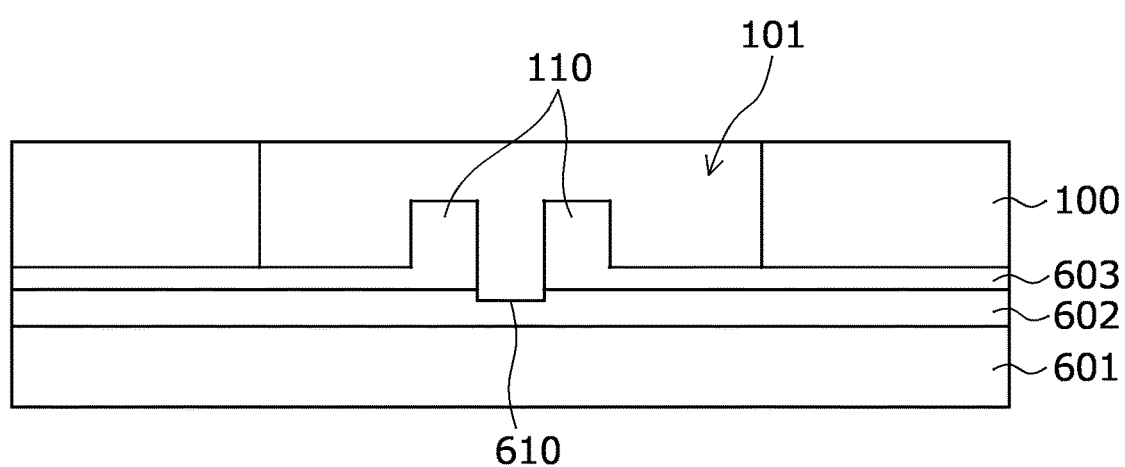
FIG. 6 is an enlarged view of a portion of a slot groove.

FIG. 6 is an enlarged view of a portion of the slot groove. In the configuration example in FIG. 6, the substrate includes a $SiO_2$ layer 602 formed on a surface of a Si substrate 601, a Si layer 603 formed on the surface of the $SiO_2$ layer 602, and the $SiO_2$ layer 100 described above formed on the surface of the Si layer 603. The slot groove 101 may be formed by disposing a mask on the $SiO_2$ layer 100 and performing etching. Further, a surface layer of SiN or the like may be provided on the $SiO_2$ layers.

The slot groove 101 has a center portion in the width direction (the X-direction) and in the center portion, the pair of electrodes 110 is provided, the optical waveguide 301 being formed by the pair of electrodes 110. Between the pair of electrodes 110, a groove 610 is dug and formed to the $SiO_2$ layer 602. A width of the groove 610, for example, is about 100 nm.

In the slot groove 101, the small groove 610 between the two electrodes 110 is filled with the EO polymer material 410, the electrodes 110 being covered by the EO polymer material 410. In a state in which the slot groove 101 is filled with the EO polymer material 410, voltage is applied to the two conductive electrodes 110, whereby a refractive index n of the EO polymer material 410 changes and an optical path length nd changes.

Optical modulation may be performed by inducing a suitable voltage difference with the two arms of the Mach-Zehnder interferometer 300 depicted in FIG. 3 to thereby change interference conditions of the interferometer. The shape of the two electrodes 110 is designed so that optical propagation loss of the optical waveguide 301 decreases in the state in which the slot groove 101 is filled with the EO polymer material 410.

Figure 7:
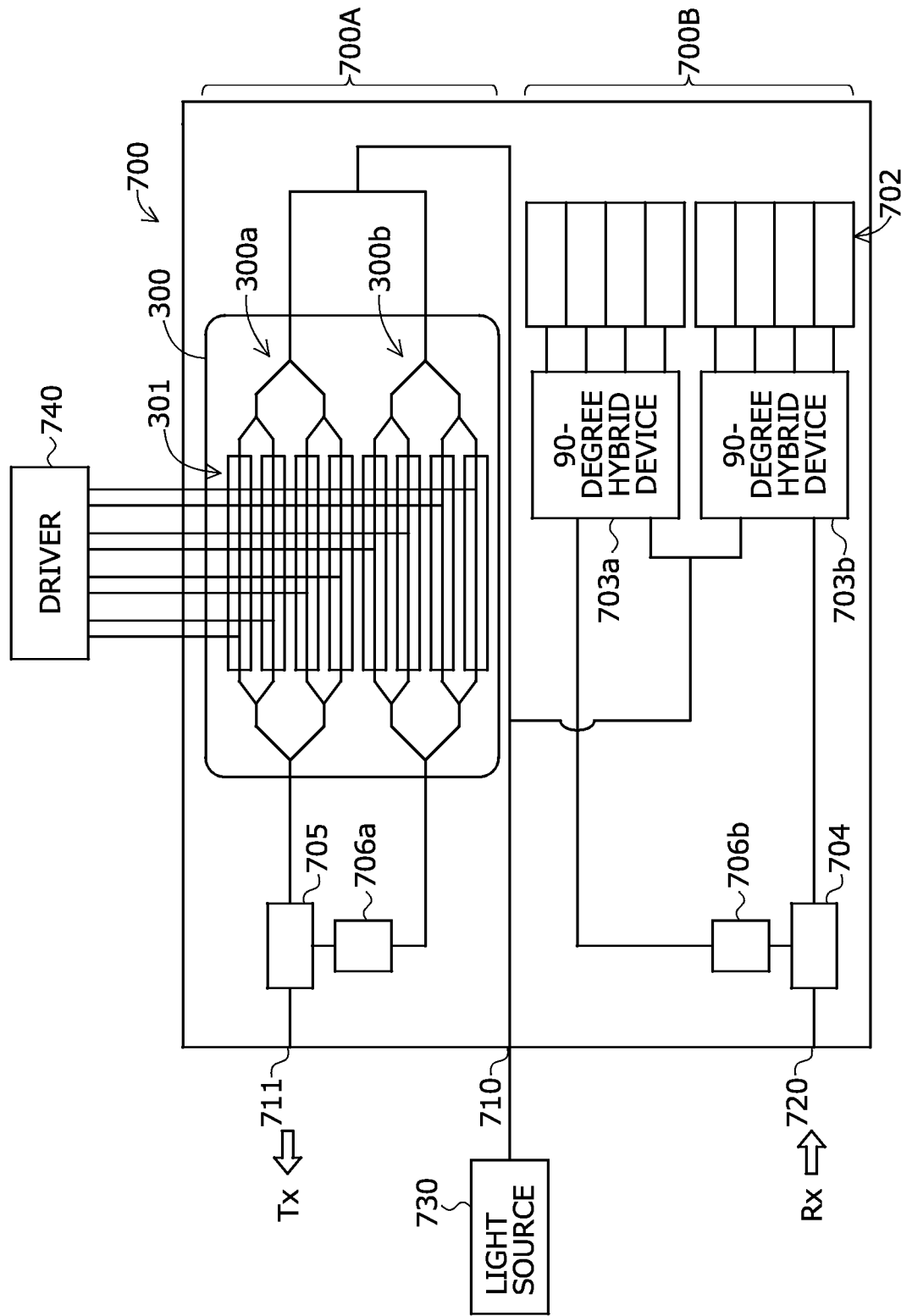
FIG. 7 is a diagram depicting a configuration example of an optical modulator.

FIG. 7 is a diagram depicting a configuration example of the optical modulator. In FIG. 7, an EO polymer optical modulator for DP-QPSK with a symbol rate of 96 Gbaud/sec is depicted as an example of an integrated optical modulator 700 having the optical waveguide device (the optical waveguide 301) described above.

The optical modulator 700 has functions of an optical transmitting unit 700A and an optical receiving unit 700B. Device elements such as the Mach-Zehnder interferometer 300, Ge-doped optical receiving devices 702, 90-degree hybrid devices 703a, 703b, a polarization splitter 704, a polarization combiner 705, and polarization rotators 706a, 706b are provided integrated in the optical modulator 700.

The optical transmitting unit 700A includes, for example, the Mach-Zehnder interferometer 300, the polarization combiner 705, the polarization rotator 706a, and a driver 740. The driver 740 outputs transmission data to the Mach-Zehnder interferometer 300 and changes the voltage of the electrodes 110 according to a modulation method to thereby change interference conditions.

The optical receiving unit 700B includes, for example, the Ge-doped optical receiving devices 702, the 90-degree hybrid devices 703a, 703b, the polarization splitter 704, and the polarization rotator 706b. These device elements 300, 702 to 706 are formed on the Si substrate 601 and are also called silicon photonic devices. Further, these device elements are connected by optical waveguides that propagate light.

On the optical transmitting unit 700A side, the Mach-Zehnder interferometer 300 of the example depicted in FIG. 7 is formed by eight of the optical waveguides 301. The eight optical waveguides 301 include two main Mach-Zehnder interferometers 300a, 300b, and four sub-Mach-Zehnder interferometers provided in each of the main Mach-Zehnder interferometers 300a, 300b.

At an optical waveguide end face 710 of the Si substrate 601, light (continuous wave (CW) light) is input from a variable wavelength laser light source 730, a portion of the input light is split and subject to desired optical modulation by the Mach-Zehnder interferometer 300. Polarization of the modulated signal light of the main Mach-Zehnder interferometer 300b of the Mach-Zehnder interferometer 300 is rotated 90 degrees by the polarization rotator 706a and then the modulated signal light is output to the polarization combiner 705.

The polarization combiner 705 combines the polarization of the modulated signal light of the main Mach-Zehnder interferometer 300a and the polarization of the modulated signal light of the main Mach-Zehnder interferometer 300b and outputs the modulated signal light (transmission signal light Tx) from an optical waveguide end face 711.

On the optical receiving unit 700B side, signal light (Rx) received from a non-depicted installed optical transmission fiber is input from an optical waveguide end face 720 of the Si substrate 601 and the input received signal light is separated into two branches of two polarizations by the polarization splitter 704 and the separated two polarizations are split and output.

The branches of the received signal light of the two polarizations separated by the polarization splitter 704 are input to the two 90-degree hybrid devices 703a, 703b. The polarization of one of the branches is rotated 90 degrees by the polarization rotator 706a and said branch is input to the 90-degree hybrid device 703a.

The light from the variable wavelength laser light source 730 input from the optical waveguide end face 710 described above is split and portions thereof are input to the two 90-degree hybrid devices 703a, 703b. The 90-degree hybrid devices 703a, 703b convert the phase state of the received signal light to light intensity, using the light from the variable wavelength laser light source 730 as local light, the local light being regarded as reference light. Optical output of the 90-degree hybrid devices 703a, 703b is received by the Ge-doped optical receiving devices 702. The optical receiving devices 702 detect optical intensity of in-phase and orthogonal polarization components of the received signal light.

Figure 8:
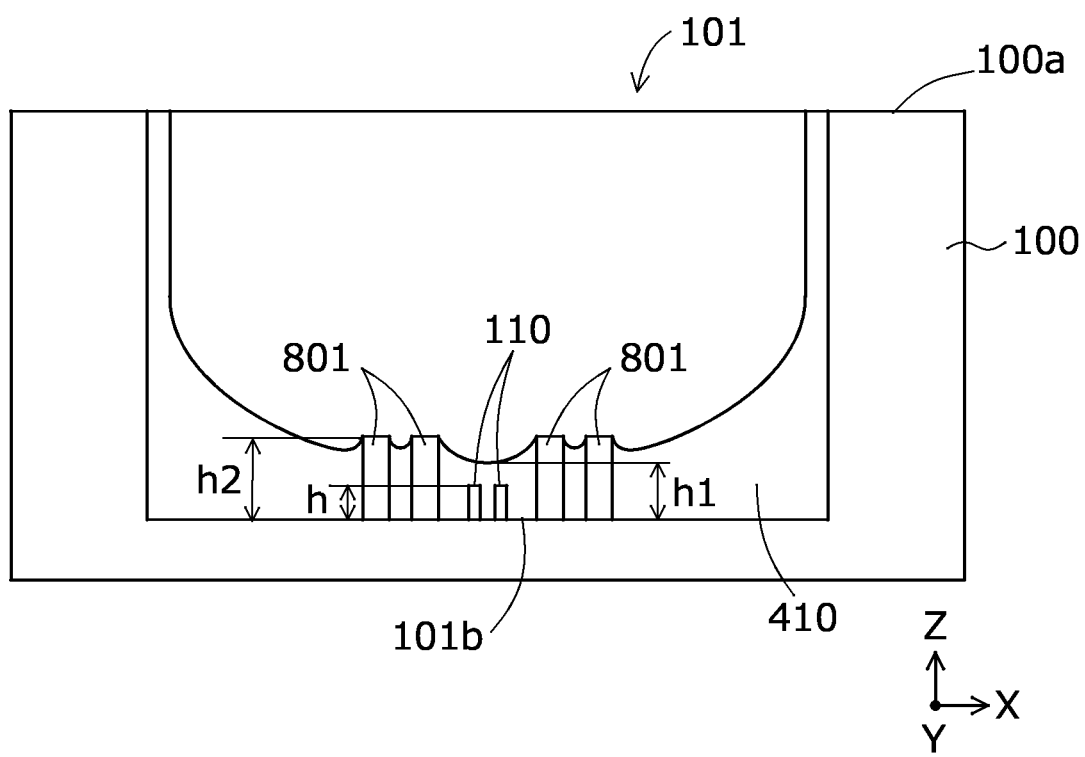
FIG. 8 is a cross-sectional view of an optical waveguide device according to another embodiment.

FIG. 8 is a cross-sectional view of an optical waveguide device according to another embodiment. In optical waveguide device depicted in FIG. 8, components similar to those in FIG. 1 are given the same reference characters used in FIG. 1. In the present embodiment, a configuration example that ensures the necessary thickness (height) h1 of the EO polymer material 410 in the slot groove 101 is described.

In the present embodiment, protruding portions 801 are provided in the slot groove 101 of the surface of the substrate. In the example depicted in FIG. 8, on the bottom 101b of the slot groove 101, the protruding portions 801 having a predetermined height h2 are provided on both sides of the electrodes 110. The height h2 of the protruding portions 801 is set to be at a position that is the same as that of the necessary thickness (height) h1 of the EO polymer material 410 or higher than h1. For example, in an instance in which the necessary thickness (height) h1 of the EO polymer material 410 is 0.6 µm, the height h2 of the protruding portions 801 is at least 0.6 µm and, for example, is set as 0.8 µm.

The protruding portions 801 may be formed by a mask and etching when the bottom 101b of the slot groove 101 is formed. Further, as depicted in FIG. 8, the protruding portions 801 may be provided in plural (2 or more) on each side of the electrodes 110.

By providing the protruding portions 801 on the sides of the electrodes 110, when the slot groove 101 is filled, the EO polymer material 410 produces surface (interface) tension at the surfaces of the protruding portions 801. As a result, the necessary thickness (height) h1 of the EO polymer material 410 may be ensured.

Here, the height h2 of the protruding portions 801 is set to be at least equivalent to the necessary thickness (height) h1 of the EO polymer material 410, whereby, as depicted in FIG. 8, the necessary thickness (height) h1 of the EO polymer material 410 at the electrodes 110 may be ensured. Further, the surface tension of the EO polymer material 410 at the surfaces of the protruding portions 801 suppresses creep of the EO polymer material 410 along the sidewalls of the slot groove 101.

In this manner, the protruding portions 801 are provided, whereby the necessary thickness h1 of the EO polymer material 410 of the optical waveguide region in the slot groove 101 may be ensured. Further, near the center portion (the electrodes 110) in the slot groove 101, the thickness of the EO polymer material 410 may be uniform within a range of about the thickness h1 to the thickness h2. For example, even in an instance in which the EO polymer material 410 is applied one time by a low-concentration solution, the necessary amount of the thickness h1 of the EO polymer material 410 may be ensured and the film thickness of the EO polymer material 410 may be uniform, whereby it becomes possible to suppress cracking and peeling of the EO polymer material 410.

Further, the number of applications of the EO polymer material 410 may be reduced and correspondingly the amount of the EO polymer material 410 used may be reduced, whereby it becomes possible to also reduce the number of manufacturing processes.

Figure 9A:
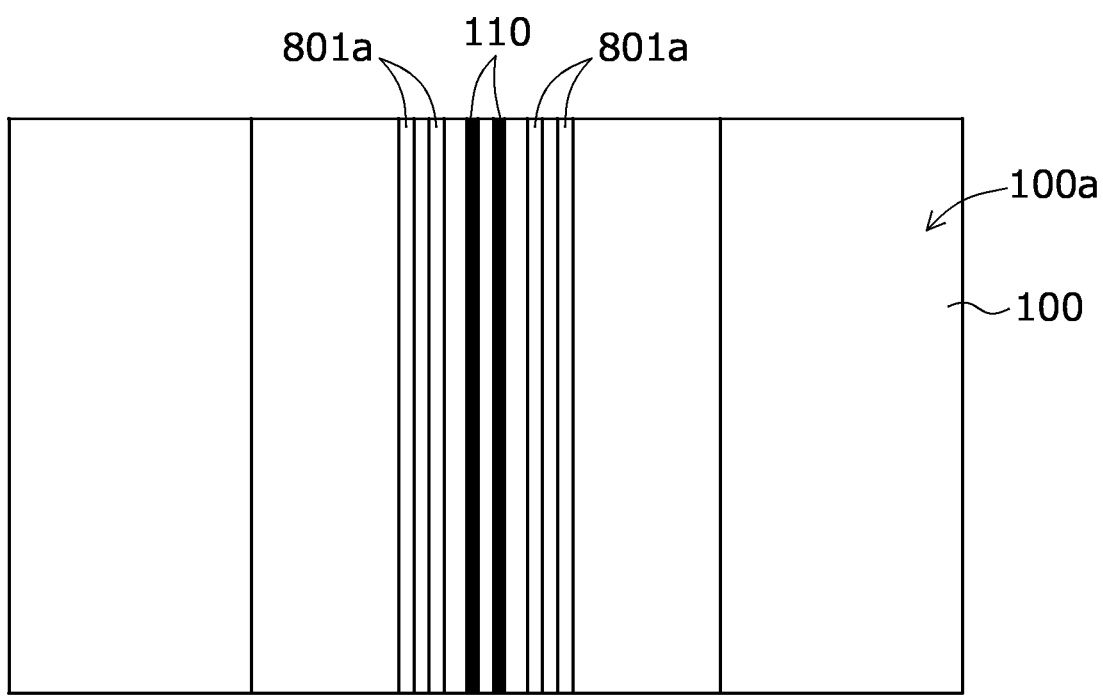
FIG. 9A is a plan view of an optical waveguide device according to another embodiment.
Figure 9B:
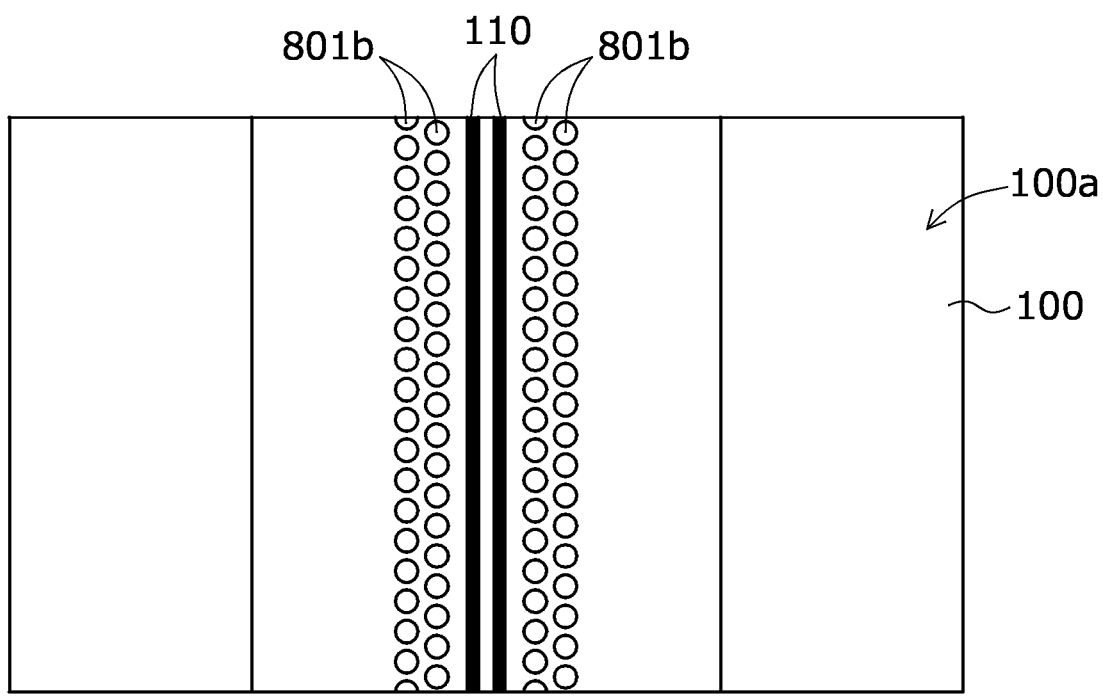
FIG. 9B is a plan view of an optical waveguide device according to another embodiment.

FIGS. 9A and 9B are plan views of an optical waveguide device according to another embodiment. In the example depicted in FIG. 9A, protruding portions 801a have a continuous shape (for example, a plate-like shape) in the length direction (the Y-direction) of the electrodes 110 and two (2 rows) of the protruding portions 801a are provided on each side of the electrodes 110. The number of rows of the protruding portions 801a may be three or more.

Further, in the example depicted in FIG. 9B, protruding portions 801b having a column-like shape are provided in the length direction (the Y-direction) of the electrodes 110. The protruding portions 801b have a circular shape in a plan view thereof and are provided in two staggered rows on each side as depicted in FIG. 9B. The shape of the protruding portions 801b in a plan view thereof is not limited to a circular shape and may be a polygonal shape; and the arrangement is not limited to staggered rows and may be an aligned arrangement of 3 or more rows in a matrix-like shape.

Figure 10:
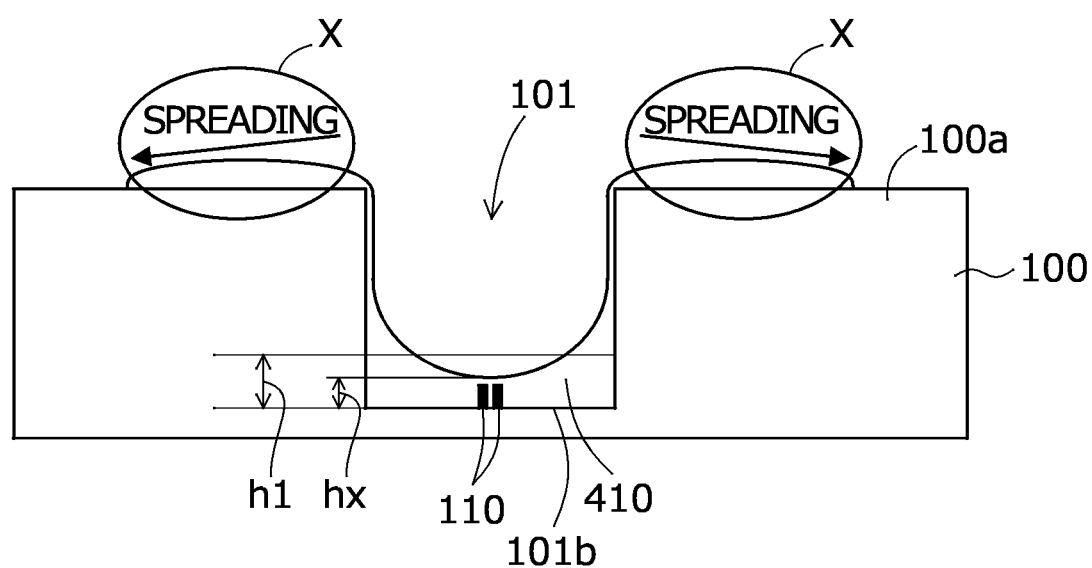
FIG. 10 is a cross-sectional view of a configuration example of a conventional optical waveguide device for comparison with the embodiments.

FIG. 10 is a cross-sectional view of a configuration example of a conventional optical waveguide device for comparison with the embodiments. In FIG. 10, for convenience, components similar to those in the embodiments are given the same reference characters used in the embodiments. In the conventional optical waveguide device, to ensure light propagation characteristics, the width of the slot groove 101 of the optical waveguide device is narrow similarly to the embodiments (for example, 30 μm). Here, the diameter (inner diameter) of the dispenser nozzle of a precision dispenser as current polymer coating equipment is greater than the width of the slot groove 101 (for example, 40 μm).

In this instance, it is difficult to keep the EO polymer material 410 applied to the slot groove 101 in the slot groove 101. Further, the EO polymer material 410 flows out from the slot groove 101 and spreads over a wide range ("X" in drawing) of the surface 100a of the SiO$_2$ layer 100.

Here, for example, in Japanese Laid-Open Patent Publication No. 2021-43263, the slot groove is shown as if being embedded with the EO polymer material. Nonetheless, in actuality, the slot groove has a minute width and the EO polymer material cannot be embedded in the slot groove; thus, as depicted in FIG. 10, the EO polymer material 410 creeps along the sidewalls from the bottom of the slot groove 101 due to surface tension.

As a result, in the optical modulator 700 depicted in FIG. 7, with the conventional technique, a problem arises in that the EO polymer material 410 that spreads adheres to other device elements disposed at the surface 100a in a periphery of the Mach-Zehnder interferometer 300 in which the slot groove 101 is provided. When the EO polymer material 410 adheres to other device elements, device assembly at subsequent manufacturing processes and reliability are affected.

In contrast, according to the embodiments, as depicted in FIG. 2, the step portions 102 are provided outside the slot groove 101, whereby the EO polymer material 410 is prevented from spreading on the surface 100a of the SiO$_2$ layer 100. As a result, contamination of other device elements on the surface 100a of the SiO$_2$ layer 100 by the EO polymer material 410 may be prevented.

Further, in the conventional optical waveguide device depicted in FIG. 10, the EO polymer material 410 in the slot groove 101 moves so as to creep up the sidewalls due to surface tension and the EO polymer material 410 has a so-called meniscal shape in a cross-sectional view thereof. As a result, a problem arises in that the amount of liquid in the slot groove 101 decreases, the thickness of the EO polymer material 410 from the bottom 101b of the slot groove 101 is hx, and the necessary thickness h1 of the EO polymer material 410 cannot be ensured, thereby, degrading the optical characteristics of the optical waveguide.

In contrast, according to the embodiments, as depicted in FIG. 8, the protruding portions 801 of a predetermined height are provided in the slot groove 101, adjacent to the electrodes 110, whereby it becomes possible to ensure the necessary thickness h1 of the EO polymer material 410 in the slot groove 101. Furthermore, the EO polymer material 410 may be uniform and have a suitable thickness, whereby propagation loss of the optical waveguide is suppressed and enhancement of optical characteristics becomes possible.

In the embodiments described above, the configuration may be a combination of the configuration in which the step portions 102 are provided on both sides of the slot groove 101 (refer to FIGS. 1, 4A, 4BA, 4BB, etc.) and the configuration in which the protruding portions 801 are provided in the slot groove 101 (refer to FIG. 8, etc.). As a result, it becomes possible to prevent the spreading of the EO polymer material 410 on the surface 100a of the SiO$_2$ layer 100 and to ensure the necessary thickness h1 of the EO polymer material 410 in the slot groove 101.

As described above, the optical waveguide devices of the embodiments have the slot groove formed in the substrate, the pair of electrodes disposed in the slot groove, the electro-optic polymer material in the slot groove, and the step portions formed on outer sides of the slot groove in the length direction of the slot groove. With respect to the electro-optic polymer material that has crept up the sidewalls from the slot groove due to surface tension, the step portions prevent the spreading of the electro-optic polymer material onto the surface of the substrate. As a result, other device elements provided on the surface of the substrate may be prevented from becoming contaminated by the electro-optic polymer material. Further, of the electro-optic polymer material in the slot groove, the amount suppressed from overflowing the step portions and flowing outside the slot groove can be retained in the slot groove, whereby the necessary thickness of the electro-optic polymer material in the slot groove may be ensured. Further, the number of applications of the electro-optic polymer material may be reduced, whereby the amount of the electro-optic polymer material used may be correspondingly reduced and the number of manufacturing processes may also be reduced.

Further, in the optical waveguide device, the recesses are formed in the width direction of the slot groove of the substrate, whereby the step portions may be formed between the slot groove and the recesses. Further, the step portions may be formed as wall portions protruding at a position that is a predetermined distance from the slot groove in the width direction of the slot groove of the substrate. In this manner, the recesses may be formed at the surface of the substrate, or the step portions may be form by the wall portions; the step portions, for example, may be formed simply by a mask and etching, etc.

Further, the optical waveguide device may have a pair of protruding portions formed at the bottom of the slot groove, straddling both sides of the pair of electrodes. As a result, it becomes possible to ensure the necessary thickness of the electro-optic polymer material in the slot groove. Further, the electro-optic polymer material may be uniform and have a suitable thickness, whereby cracking and peeling of the electro-optic polymer material after application are suppressed while propagation loss of the optical waveguide is suppressed, and optical characteristics may be enhanced.

Further, in the optical waveguide device, the protruding portions are provided and have a height that is equivalent to at least the necessary thickness of the electro-optic polymer material at a position at the bottom of the slot groove. As a result, the necessary thickness of the electro-optic polymer material may be obtained in the slot groove and the electro-optic polymer material may be made uniform.

Further, in the optical waveguide device, multiple protruding portions may be provided on each side of the pair of electrodes. As a result, the necessary thickness of the electro-optic polymer material may be obtained in the width direction of the slot groove and the electro-optic polymer material may be made uniform.

Further, in the optical waveguide device, the protruding portions may be provided in a linear shape along the length direction of the pair of electrodes or as multiple protuberances. In this manner, the protruding portions may have various types of shapes, the necessary thickness of the electro-optic polymer material in the slot groove may be obtained, and the electro-optic polymer material may be made uniform.

Further, the optical modulator may use the optical waveguide device described above for the Mach-Zehnder interferometer. The optical modulator is configured by, for example, the Mach-Zehnder interferometer, the light source, the driver, the polarization combiner, the polarization rotator, and the optical waveguide for optical transmission. In such an optical modulator, by including the optical waveguide device described above, it becomes possible to enhance the optical characteristics of the optical modulator.

The optical waveguide device described above has a configuration that ensures the thickness of the EO polymer material in the slot groove of the optical waveguide and thereby, prevents spreading of the EO polymer material outside of the slot groove. Thus, the optical waveguide device is further applicable to other optical waveguides and application is not limited to the optical waveguide of the Mach-Zehnder interferometer of the optical modulator described above.

According to one embodiment, the optical modulator and the optical waveguide device are proposed in which the slot groove is formed in the substrate, the pair of electrodes are disposed in the slot groove, the slot groove is filled with the electro-optic polymer material, and the step portions are formed along the outer sides of the slot groove, in the length direction of the slot groove.

According to one aspect, spreading of the electro-optic polymer material outside the slot groove may be prevented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical waveguide device, comprising:
a slot groove formed in a substrate;
a pair of electrodes disposed in the slot groove;
an electro-optic polymer material in the slot groove; and
a step portion formed at an outer side of the slot groove, in a length direction of the slot groove.

2. The optical waveguide device according to claim 1, wherein
the step portion is formed by a recess that is formed in the substrate, in a width direction of the slot groove, the step portion being formed between the slot groove and the recess.

3. The optical waveguide device according to claim 1, wherein
the step portion is a wall portion that has a protruding shape, the wall portion being formed on the substrate, at a position that is a predetermined distance from the slot groove in a width direction of the slot groove.

4. The optical waveguide device according to claim 1, further comprising
a pair of protruding portions formed in the slot groove, the pair of protruding portions straddling both sides of the pair of electrodes.

5. The optical waveguide device according to claim 4, wherein
the pair of protruding portions has a height that is at least equal to a necessary thickness of the electro-optic polymer material at a position at a bottom of the slot groove.

6. The optical waveguide device according to claim 4, further comprising
a plurality of the pair of protruding portions straddling both sides of the pair of electrodes.

7. The optical waveguide device according to claim 4, wherein
each of the pair of protruding portions has a plate-like shape in a length direction of the pair of electrodes or is constituted by a plurality of column-shaped protuberances.

8. An optical modulator, comprising
the optical waveguide device according to claim 1, the optical waveguide device being used for a Mach-Zehnder interferometer.

9. The optical modulator according to claim 8, further comprising:
a light source;
a driver;
a polarization combiner;
a polarization rotator; and
an optical waveguide for optical transmission.

* * * * *